United States Patent [19]
Lindoy et al.

[11] Patent Number: 6,139,752
[45] Date of Patent: Oct. 31, 2000

[54] COMPOSITION AND METHOD FOR SELECTIVELY REMOVING METAL IONS FROM AN AQUEOUS SOLUTION

[75] Inventors: Leonard Francis Lindoy, Camperdown, Australia; Peter Anthony Tasker, Edinburgh, United Kingdom; Ian Murray Atkinson, Townsville, Australia; Derek Thorp, Heywood, United Kingdom

[73] Assignee: Zeneca Limited, London, United Kingdom

[21] Appl. No.: 08/952,760

[22] PCT Filed: May 13, 1996

[86] PCT No.: PCT/GB96/01127

§ 371 Date: Apr. 17, 1998

§ 102(e) Date: Apr. 17, 1998

[87] PCT Pub. No.: WO96/36435

PCT Pub. Date: Nov. 21, 1996

[30] Foreign Application Priority Data

May 20, 1995 [GB] United Kingdom .................... 9510222

[51] Int. Cl.⁷ .............................. B01D 15/00; B01J 20/22
[52] U.S. Cl. .......................... 210/681; 210/682; 210/688; 502/401
[58] Field of Search ................................. 210/681, 682, 210/688; 502/401

[56] References Cited

U.S. PATENT DOCUMENTS

| 5,039,419 | 8/1991 | Bradshaw et al. | 502/401 |
| 5,084,430 | 1/1992 | Tarbet et al. | 502/401 |
| 5,173,470 | 12/1992 | Bruening et al. | 502/401 |
| 5,182,251 | 1/1993 | Bruening et al. | 502/401 |
| 5,190,661 | 3/1993 | Bruening et al. | 210/670 |

FOREIGN PATENT DOCUMENTS

301777  12/1993  Germany .

OTHER PUBLICATIONS

Kadlec et al: "Separation of Uin and Multivalent Cations and Selective De–ionisation by a Phosphonic Cation Exchanger", Journal of Applied Chemistry & Biotechnology, vol. 23, No. 1, Jan. 1973, pp. 41–50, XP002011730, see pp. 41–43.

*Primary Examiner*—Ivars Cintins
*Attorney, Agent, or Firm*—Pillsbury Madison & Sutro LLP

[57] ABSTRACT

A composition of matter is provided in which a phosphonic acid or phosphonic acid ester group is linked through a thioether residue to a silicon atom which is further covalently bonded to a solid inorganic support. The compositions can be employed to selectively separate metal ions having high cationic charge from a solution containing lower-charged cations, and also to selectively separate highly charged cations having a relatively high charge density from cations having the same charge, but a lower charge density.

20 Claims, No Drawings

COMPOSITION AND METHOD FOR SELECTIVELY REMOVING METAL IONS FROM AN AQUEOUS SOLUTION

This application is the national phase of international application PCT/GB96/01127, filed May 13, 1996 which designated the U.S.

This invention relates to compositions of matter and more particularly to ligand-bearing compounds and to the use thereof in removing molecules and ions from solution.

The use of ligands for removing ions and molecules from solution is well known. In particular, it is known to use various ligands to remove metal ions from the aqueous solutions obtained in the hydrometallurgical recovery of metals by treating metal ores with acids. In some cases, a ligand is used to extract valuable metal ions selectively from solution in the form of a metal-ligand complex which is then subjected to further treatment to recover the desired metal from the complex. In other cases, a ligand is used to extract contaminant metal ions selectively from a solution containing a more valuable metal, the solution then being further treated to recover the valuable metal in pure form.

Ligands may also be used for the selective removal of metal ions from water supplies or from waste solutions to permit safe disposal.

In many cases, the ligand is a solvent-soluble organic compound such as an o-hydroxyaryloxime, a β-diketone, a hydroxyamic acid or an ester of various phosphorus oxy-acids and is used in the form of a solution in a water-immiscible organic solvent such as kerosene. In other cases, a ligand material is physically or chemically attached to a solid support material which may be organic or inorganic in nature.

In U.S. Pat. No. 5,182,251, there is described a method for the removal and concentration of certain metal ions from a multiple ion source by bringing the source solution into contact with a compound comprising an aminoalkylphosphonic acid containing ligand covalently bonded through an organic spacer silicon grouping to a solid inorganic support. However, in the course of studies resulting in the present invention, such supported compounds were found to be poor extractants under highly acidic conditions.

U.S. Pat. No. 5,190,161 teaches the use for metal extraction of thiophenols and thioalkyl carboxylates bonded via the thio moiety and an organic spacer group to silica, but discloses that such compounds do not preferentially extract more highly charged ions over less highly charged ions.

It has now been found that materials in which a phosphonic acid or phosphonic acid ester ligand group is bonded through a thioether residue and a silicon atom to a solid inorganic support are extremely effective in selectively removing metal ions from solution even under highly acidic conditions and which in certain embodiments can selectively extract more highly charged cations from aqueous solutions also containing less highly charged cations. Furthermore, the complexed metal ions may easily be stripped from the supported ligand material using simple techniques.

Accordingly, the invention provides a composition of matter in which a phosphonic acid or phosphonic acid ester group is linked through a thioether residue to a silicon atom which is further covalently bonded to a solid inorganic support.

The compounds of the invention may typically be represented by the Formula (1):

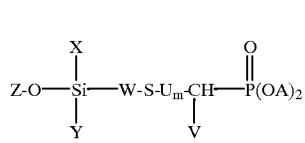
(1)

wherein: Z represents a solid inorganic support;
each of X and Y, independently, represents Cl, Br, I, optionally substituted lower alkyl, optionally substituted lower alkoxy, a group of the formula Z—O— or a group of the formula:

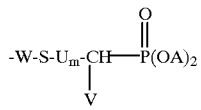

wherein:
each of W and U represents an organic spacer group;
m represents an integer of 0 or 1,
V represents H, alkyl or

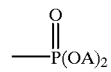

and A represents H or optionally substituted hydrocarbyl.

As examples of solid inorganic supports which may be represented by Z, there may be mentioned hydrophilic inorganic supports such as silica-based materials, for example silica gel, sand, quartz, silicates, glass, glass fibres and clays and other oxides that can be reacted with a silane, for example alumina, such as γ-alumina, zirconia, titania and nickel oxide.

As examples of lower alkyl and lower alkoxy groups which may be represented by X and Y, there may be mentioned groups having from 1 to 6 carbon atoms, especially methoxy groups.

As examples of organic spacer groups which may be represented by W, there may be mentioned groups of the formula:

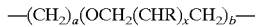

wherein R represents H, —SH, —OH, lower alkyl or aryl, a is an integer of at least 1, often from 2–10, preferably 5 or less and is particularly preferably 3, and b and x are independently integers of 0 or 1. Thus, for example, W may be a trimethylene group.

As examples of organic spacer groups which may be represented by U, there may be mentioned divalent hydrocarbon groups, for example $(CH_2)_n$ where n represents an integer from 1 to 10, especially 1. Commonly, $U_m$ represents a methylene group, or m is 0. Other divalent hydrocarbon groups include arylene groups.

Optionally substituted hydrocarbyl groups which may be represented by A particularly include lower alkyl groups, such as those having from 1–4 carbon atoms, particularly methyl and/or ethyl groups.

Alkyl groups which may be represented by V are typically those comprising from 1–4 carbon atoms. The alkyl groups may be substituted. When V represents an alkyl group, it is commonly a methyl or ethyl group. When m is 0, V most commonly represents a methyl group.

Compounds of Formula (1) may be prepared by reacting a silane of Formula (2):

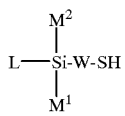
(2)

wherein W is as hereinbefore defined, L represents Cl, Br, I, optionally substituted lower alkyl or optionally substituted lower alkoxy, especially methoxy, and $M^1$ and $M^2$ independently represent L or —W—SH, with, in either order
(i) a solid inorganic matrix, and
(ii) a compound containing a phosphonic acid or phosphonic acid ester group and a group capable of reacting with the —SH group of the compound of Formula (2).

Groups capable of reacting with the —SH group of the compound of Formula (2) include groups susceptible to nucleophilic substitution by a —SH group, such as those comprising chloro, bromo, iodo, optionally substituted alkyl or aryl sulphonates and diazonium groups; groups susceptible to nucleophilic addition by a —SH, for example epoxides; and groups comprising unsaturated carbon-carbon bonds, particularly alkenes. Preferred groups capable of reacting with the —SH group of Formula (2) include unsaturated alkyl phosphonic acids and phosphonic acid esters, particularly C2–C6 alkenes substituted with one or more phosphonic acid or phosphonic acid ester groups, for example vinyl phosphonic acid and vinyl-1,1-diphosphonic acid.

A typical compound of Formula (2) is 3-mercaptopropyltrimethoxysilane.

The compositions of the invention may be used for the selective removal of molecules or ions from solution and especially for the selective removal of metal ions from aqueous solutions which may contain other metal ions, possibly in much higher concentration than the ions to be removed. The compositions are particularly effective for removing metal ions having high cationic charge from solutions which may also contain hydrogen ions and/or metal ions having lower cationic charge. For example, the compositions may be used for removing trivalent metal ions from aqueous solutions also containing divalent and/or monovalent metal ions.

This aspect of the invention is of particular importance for the removal of iron in the form of $Fe^{3+}$ ions from solutions of zinc salts, such as may be obtained by the leaching of zinc-bearing ores. Leaching of the ore with dilute sulphuric acid produces a solution containing a mixture of metals, primarily zinc and iron. This solution may then be contacted with a solution in a water-immiscible organic solvent (non-aqueous phase) of an organic extractant which complexes with the zinc to form an extractant-zinc complex which is preferentially soluble in the non-aqueous phase. The zinc may then be recovered by a further extraction step in which the non-aqueous phase, containing the complex, is contacted with another aqueous medium (second aqueous phase) containing an agent, typically a strong acid, capable of decomposing the complex so that the zinc is extracted into the second aqueous phase from which it can be recovered by suitable procedures such as electrowinning, using the second aqueous phase as electrolyte.

Although selective extractants are used, these are not generally 100% selective for zinc and often carry over small proportions, relative to the zinc, of iron, which is then extracted into the second aqueous phase along with the zinc.

While some electro-winning processes can tolerate low proportions of impurities in the second aqueous phase, others, such as that for zinc, are susceptible to very low proportions of such impurities and can tolerate only very low proportions of contaminants. It is, therefore, desirable to remove even relatively small proportions of iron following solvent extraction so that it does not appear and/or build up in the electrolyte of the electrowinning process, or interfere with the electro-winning process itself.

In our EP-A-0573182, there is described a process for extracting metal values, especially zinc, from aqueous solutions of metal salts which comprises contacting the aqueous solution with an organic phase comprising a compound of Formula (3):

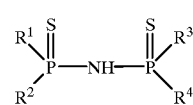
(3)

wherein each of $R^1$, $R^2$, $R^3$ and $R^4$, independently, represents an optionally substituted hydrocarbyl or hydrocarbyloxy group or $R^1$ and $R^2$ together with the attached phosphorus atom and/or $R^3$ and $R^4$ together with the attached phosphorus atom form a 5- to 8-membered heterocyclic ring.

In our International application No. PCT/GB94/02485, there is described a similar process wherein, in the compound of Formula (3), $R^1$ is an optionally substituted 2-alkylphenoxy group, each of $R^2$, $R^3$ and $R^4$ is a group selected from optionally substituted 2-alkylphenoxy, optionally substituted phenyl, optionally substituted alkyl and optionally substituted alkoxy and at least one optionally substituted 2-alkylphenoxy group has a tertiary alkyl substituent except the compound wherein each of $R^1$ and $R^2$ is 2-isopropyl-4-tert-nonylphenoxy and each of $R^3$ and $R^4$ is phenyl and the compound wherein $R^4$ is 2-methyl-4-tert-nonylphenoxy, $R^2$ is 2,4-dimethylphenoxy and each of $R^3$ and $R^4$ is phenyl.

Both applications describe a four stage process comprising:

(1) contacting a first aqueous phase containing zinc values with a solution of an extractant compound of Formula (3) in a water-immiscible organic solvent whereby to extract zinc values into the solvent in the form of a complex of the zinc with the extractant;

(2) separating the solvent phase containing zinc complex from the extracted aqueous phase;

(3) contacting the solvent phase containing zinc complex with a second aqueous phase whereby to strip the zinc values from the loaded solvent phase into the second aqueous phase, and (4) separating the second aqueous phase from the stripped solvent phase.

When applying such a four stage process to a first aqueous phase containing $Fe^{3+}$ ions in addition to zinc, it is particularly convenient, in order to remove iron before electrowinning, to contact the second aqueous phase, containing zinc and a relatively small proportion of iron, with a composition according to the present invention. In this way, iron may be removed almost quantitatively without reducing the concentration of zinc to any appreciable extent.

Other separations of cations having high charge from solutions containing cations of lower charge for which the compositions according to the present invention may be employed include the separation of $Bi^{3+}$ and/or $Sb^{3+}$ ions from solutions also comprising $Cu^{2+}$ ions. The compositions according to the present invention can also be contemplated for the separation of $Ga^{3+}$, $In^{3+}$ and/or $Ge^{4+}$ from aqueous solutions, for example from aqueous solutions also comprising $Zn^{2+}$ ions, and in particular from dilute HCl solutions.

Compositions of the invention may also be used to remove lanthanide and actinide ions from aqueous solutions and especially to remove undesirable metals, for example aluminium, from public water supplies.

Surprisingly it has also been found that the compositions according to the present invention can, in certain embodiments, be employed to separate certain cations having a high cationic charge, such as 3+ or higher, from an aqueous solution also comprising other cations of the same charge. Without wishing to be bound by any theory, it is believed that in these circumstances, the composition according to the present invention selectively extracts those cations having a relatively higher charge density over those cations of the same charge but relatively lower charge density. This selective extraction can advantageously be applied, for example, to the separation of relatively high charge density lanthanides and/or actinides from aqueous solution also comprising relatively lower charge density lanthanides and/or actinides. The compositions of the invention are particularly suited to the separation of lanthanide $M^{3+}$ ions having a crystal ionic radius (as quoted in Lange's Handbook of Chemistry, 13th Edition, 3-121 to 126, published by McGraw Hill) of 0.95 or less from those lanthanide $M^{3+}$ ions having a crystal ionic radius of greater than 0.95 and particularly at least 1.0. Examples of such selective lanthanide separations include the separation of Eu 3 and/or $Er^{3+}$ ions from aqueous solutions also comprising $La^{3+}$, $Nd^{3+}$ and/or $Ce^{3+}$ ions.

The solutions employed in the selective extraction methods are commonly acidic, usually having a pH of less than about pH5, often less than about 4, more often less than about 3 and preferably a pH of 2 or less. However, for the removal of aluminium ions from public water supplies, the pH can be the natural pH of the water supply, which may be acidic, neutral or slightly alkaline, although the pH can be adjusted if required, for example to a pH in the range of from 2.5 to 4.5.

The treatment of solutions, for example aqueous solutions of metal ions, with a composition of the invention may conveniently be effected by passing the solution through a column packed with said composition but any other method of intimately contacting the solution with the particulate composition may be used.

Whichever treatment method is used, the result is complexation of the composition of the invention with the metal ions removed from the aqueous solution. The complexed ions may then be removed in a separate treatment with a means for decomplexing the complexed ions, for example by exposing the composition to a solution of an appropriate regenerating agent.

The choice of regenerant solution depends upon the ions being removed and may be, for example, acidic, basic, a reducing agent or a complexing agent having a stronger affinity for the ions than has the composition of the invention. For the decomplexation of $Fe^{3+}$ ions, for example after treating a solution containing zinc and iron, dilute sulphuric acid may be used, as may a solution of an organic phosphonic acid or phosphonate chelant, particularly a compound of Formula (4):

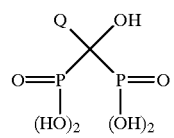

(4)

where Q is an organic residue, for example an alkyl group. The compound of Formula (4) in which Q is methyl is available as "Briquest" ADPA 60A from Albright and Wilson.

In many cases, it is necessary to treat the complexed composition of the invention with only a relatively small amount of regenerant solution so that the solution of decomplexed ions obtained is more concentrated than the original aqueous solution. After regeneration, the composition of the invention may by re-used in a process for removing molecules or ions from solution.

Ions may be removed from the regenerant solution using any conventional method, the regenerant solution then being re-used for the decomplexation of compositions of the invention.

The invention is illustrated but not limited by the following Examples.

EXAMPLE 1

A mixture of silica gel 60 (100 g, ex Fluka) and 3-mercaptopropyltrimethoxysilane (20 g) in methanol (20 ml) was turned slowly on a rotary evaporator at 60° C. for 3 hours. The product was cooled to room temperature, filtered, washed with methanol and dried in a vacuum oven at 40° C. for 18 hours.

A mixture of the above thiol modified silica gel 60 (20 g) and vinyl phosphonic acid (20 g) in distilled water (50 ml) was allowed to turn slowly on the rotary evaporator at 80° C. for 8 hours. The product was cooled to room temperature, filtered and washed with distilled water, methanol and finally acetone. The phosphonic acid modified silica gel was dried in a vacuum oven at 40° C. for 18 hours.

A column (1 cm diameter) was packed by pouring phosphonic acid modified silica gel into the column to a length of 5.5 cm and then covering it with a small plug of glass wool. A solution containing 180 g/l $H_2SO_4$, 70 g/l $ZnSO_4$ and 30 ppm $Fe^{3+}$ as the sulphate complex was run down the column maintaining a head of 18 cm of solution above the modified silica with a flow rate of 0.66 ml/min. Fractions of precise volume were collected at 10 ml intervals for analysis. After feeding 100 ml of solution, the column was loaded with 2800 $\mu g$ Fe(III). When 80 ml of an aqueous solution containing 180 g/l $H_2SO_4$ and about 200 mg/l Zn as $ZnSO_4$ but no iron was run down a separate column packed in the same way, substantially no zinc was removed from the solution, with samples of eluent taken at 10 ml intervals each being found to contain about 200 mg/l Zn. The results of these metal extraction trials demonstrated the selectivity of the compositions according to the invention for extracting iron (III) over zinc (II).

The column was then washed with 100 ml of water and stripped free from iron by the passage of a solution containing 25 g of "Briquest" ADPA 60A in 100 ml water. Stripping was achieved in approximately 2 bed volumes.

Stripping may also be effected using a solution of 25 g of "Briquest" ADPA 60 A in 180 g/l $H_2SO_4$ or a solution of 25 g of Briquest ADPA 60 A in 180 g/l $H_2SO_4$ containing 70 g/l $ZnSO_4$.

EXAMPLE 2

A column containing phosphonic acid modified silica gel was prepared as described in Example 1.

A solution containing 52 ppm of aluminium was prepared by dissolving about 0.315 g of aluminium sulphate octadecahydrate in 500 ml distilled water (the solution had a pH value of 3.75) and 150 ml was run down the column, maintaining a head of 18 cm. Fractions of precise volume were collected at 10 ml intervals for analysis. After collecting 120 ml of the eluent, no aluminium (<1 ppm) was detected in the solutions.

The column was then washed with distilled water and stripped free of aluminium by the passage of a solution containing 25 g of "Briquest" ADPA 60 A in 100 ml distilled water. Complete stripping of the aluminium from the silica gel column was achieved in approximately 2 bed volumes.

In a further experiment, a solution containing 560 ppm of aluminium was prepared by dissolving about 3.15 g of aluminium sulphate octadecahydrate in 500 ml distilled water. When 120 ml of this solution was fed to the column, 22.5 mg of aluminium was removed from the solution. This was considered to represent the capacity of the column for aluminium.

EXAMPLE 3

A column containing the phosphonic acid modified silica gel was prepared as described in Example 1.

150 ml of a feed solution containing a mixture of lanthanum (III) sulphate (0.02 g), europium (III) sulphate (0.02 g), erbium (III) sulphate (0.02 g), neodymium (III) sulphate (0.02 g) and cerium (III) sulphate (0.02 g) in 0.5% sulphuric acid was prepared and was run down the column, maintaining a head of 18 cm. Fractions of precise volume were collected at 10 ml intervals for analysis.

The fractions were analysed for metal content by Inductively Coupled Plasma Spectrometry and compared with the analysis of the feed solution. The results are given below:

| Sample | Metal Content (mg/l) | | | | |
|---|---|---|---|---|---|
| | Er | Eu | La | Nd | Ce |
| 10 ml | <0.1 | <0.1 | 0.7 | <0.5 | <0.1 |
| 20 ml | 0.1 | 0.2 | 1.9 | 1.2 | 1.8 |
| Feed solution | 1.7 | 1.7 | 1.8 | 1.8 | 1.9 |

The results showed that $Eu^{3+}$ and $Er^{3+}$ could selectively be extracted from the feed solution.

EXAMPLE 4

The method of Example 1 was repeated, except that the vinyl phosphonic acid was replaced with vinyl-1,1-diphosphonic acid, prepared by the method of Degenhardt and Burdsall, J. Org. Chem., 1986, 51, 3488–90, and that in the metal extraction trial, 27 ppm iron (III) sulphate and 170 g/l $ZnSO_4$ in 180 g/l $H_2SO_4$ solution was employed.

Analysis of samples of the eluent by atomic absorption spectroscopy showed that the sample after 30 ml of solution had eluted contained about 2 mg/l iron, and that after 40 ml had eluted only about 4 mg/l iron.

What is claimed is:

1. A composition of matter comprising a phosphonic acid or phosphonic acid ester group linked through a thioether residue to a silicon atom which is further covalently bonded to a solid inorganic support.

2. A composition according to claim 1 having the Formula (1):

$$Z-O-\underset{\underset{Y}{|}}{\overset{\overset{X}{|}}{Si}}-W-S-U_m-\underset{\underset{V}{|}}{CH}-\overset{\overset{O}{\|}}{P}(OA)_2 \quad (1)$$

wherein: Z represents a solid inorganic support;

each of X and Y, independently, represents Cl, Br, I, optionally substituted lower alkyl, optionally substituted lower alkoxy, a group of the formula Z—O— or a group of the formula:

$$-W-S-U_m-\underset{\underset{V}{|}}{CH}-\overset{\overset{O}{\|}}{P}(OA)_2$$

each of W and U represents an organic spacer group;
m represents an integer of 0 or 1,
V represents H, alkyl or $$-\overset{\overset{O}{\|}}{P}(OA)_2$$

and A represents H or optionally substituted hydrocarbyl.

3. A process for the preparation of a composition according to claim 1 or claim 2 which comprises reacting a silane of the Formula (2):

$$L-\underset{\underset{M^1}{|}}{\overset{\overset{M^2}{|}}{Si}}-W-SH \quad (2)$$

wherein: L represents Cl, Br, I, optionally substituted lower alkyl or optionally substituted lower alkoxy, W represents an organic spacer group, and
$M^1$ and $M^2$ independently represent L or —W—SH, with, in either order:
  (i) a solid inorganic support, and
  (ii) a compound containing a phosphonic acid or phosphonic acid ester group and a group capable of reacting with the —SH group of the compound of Formula (2).

4. A process according to claim 3, wherein the solid inorganic support is a silica-based material.

5. A process according to claim 3, wherein W is a group of the formula:

$$-(CH_2)_a(OCH_2(CHR)_xCH_2)_b-$$

wherein: R represents H, —SH, —OH, lower alkyl or aryl, a is an integer from 2 to 10 and b and x are each independently an integer of 0 or 1.

6. A composition according to claim 1 or claim 2, wherein the solid inorganic support is a silica-based material.

7. A composition according to claim 2, wherein W is a group of the formula:

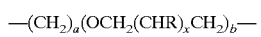

wherein: R represents H, —SH, —OH, lower alkyl or aryl, a is an integer from 2 to 10 and b and x independently are each an integer of 0 or 1.

8. A composition according to claim 2 wherein U is a group of the formula —(CH$_2$)$_n$— wherein n is an integer from 1 to 10.

9. A composition according to claim 8, wherein the solid inorganic support is a silica-based material.

10. A method for the selective removal of aluminum ions from an aqueous solution which may contain other metal ions which comprises contacting said solution with a composition of matter according to claim 1.

11. A method for the selective removal of metal ions having a cationic charge of 3+ or higher from an aqueous solution also containing hydrogen ions and/or metal ions having lower cationic charge which comprises contacting said solution with a composition according to claim 1.

12. A method according to claim 11 which comprises removing trivalent metal ions from a solution also containing divalent and/or monovalent metal ions.

13. A method according to claim 12 which comprises removing Fe$^{3+}$ ions from a solution of zinc and iron salts.

14. A method for the selective removal of metal ions having a cationic charge of 3+ or higher and relatively high charge density from an aqueous solution also containing one or more metal ions having the same cationic charge but a relatively low charge density, which comprises contacting said solution with a composition according to claim 1.

15. A method according to claim 12 wherein the high charge density and low charge density cations are lanthanides.

16. A method according to claim 15 in which Eu$^{3+}$ and/or Er$^{3+}$ ions are separated from an aqueous solution also comprising one or more of La$^{3+}$, Ce$^{3+}$ and Nd$^{3+}$ ions.

17. A method according to any one of claims 11, 12, 13, 14, 15, or 16, in which the composition of matter with which the aqueous solution is contacted has the Formula (1):

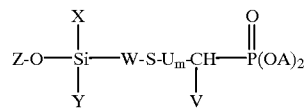 (1)

wherein: Z represents a solid inorganic support;
each of X and Y, independently, represents Cl, Br, I, optionally substituted lower alkyl, optionally substituted lower alkoxy, a group of the formula Z—O— or a group of the formula:

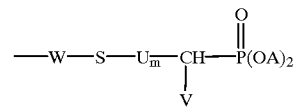

each of W and U represents an organic spacer group;
m represents an integer of 0 or 1,
V represents H, alkyl or

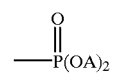

and A represents H or optionally substituted hydrocarbyl.

18. A method according to claim 17, wherein the solid inorganic support is a silica-based material.

19. A method according to claim 17, wherein W is a group of the formula:

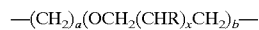

wherein: R represents H, —SH, —OH, lower alkyl or aryl, a is an integer from 2 to 10 and b and x are each independently an integer of 0 or 1.

20. A method according to claim 17, wherein U is a group of the formula —(CH$_2$)$_n$— wherein n is an integer from 1 to 10.

* * * * *